United States Patent
Yoon

(10) Patent No.: US 11,703,877 B2
(45) Date of Patent: Jul. 18, 2023

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Sung Won Yoon, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 496 days.

(21) Appl. No.: 16/678,575

(22) Filed: Nov. 8, 2019

(65) Prior Publication Data
US 2020/0159236 A1    May 21, 2020

(30) Foreign Application Priority Data

Nov. 9, 2018  (KR) ........................ 10-2018-0137308

(51) Int. Cl.
| | |
|---|---|
| G05D 1/02 | (2020.01) |
| B60R 25/01 | (2013.01) |
| B60R 25/24 | (2013.01) |
| B62D 15/02 | (2006.01) |
| B60R 25/20 | (2013.01) |
| B60R 25/23 | (2013.01) |
| B60R 25/25 | (2013.01) |

(52) U.S. Cl.
CPC ........... *G05D 1/0225* (2013.01); *B60R 25/01* (2013.01); *B60R 25/2063* (2013.01); *B60R 25/23* (2013.01); *B60R 25/24* (2013.01); *B60R 25/25* (2013.01); *B62D 15/0285* (2013.01)

(58) Field of Classification Search
CPC .. G05D 1/0225; B60R 25/01; B60R 25/2063; B60R 25/23; B60R 25/24; B60R 25/25; B62D 15/0285
See application file for complete search history.

(56) References Cited

U.S. PATENT DOCUMENTS

| | | |
|---|---|---|
| 10,409,290 B2 | 9/2019 | Mielenz |
| 10,515,490 B2 | 12/2019 | Nordbruch |
| 10,889,291 B2 | 1/2021 | Gougeon et al. |
| 2010/0156672 A1 | 6/2010 | Yoo et al. |

(Continued)

FOREIGN PATENT DOCUMENTS

| | | |
|---|---|---|
| CN | 107010051 A | 8/2017 |
| CN | 107209518 A | 9/2017 |
| CN | 108473159 A | 8/2018 |

OTHER PUBLICATIONS

Extended European Search Report dated Mar. 6, 2020 from the corresponding European Application No. 19207956.4, 9 pp.

(Continued)

*Primary Examiner* — Thomas D Alunkal
(74) *Attorney, Agent, or Firm* — Lempia Summerfield Katz LLC

(57) ABSTRACT

An automated parking system and a method enable a driverless vehicle to autonomously travel and park in a vacant parking slot through communication with a parking infrastructure. The automated parking system and method also control the driverless vehicle to autonomously travel from a parking slot to a pickup area through communication with the parking infrastructure.

19 Claims, 10 Drawing Sheets

(56) References Cited

U.S. PATENT DOCUMENTS

| | | | | |
|---|---|---|---|---|
| 2012/0188100 A1* | 7/2012 | Min | ................. | G08G 1/146 |
| | | | | 340/932.2 |
| 2014/0232518 A1* | 8/2014 | Stoehr | ................. | G07B 15/04 |
| | | | | 340/5.6 |
| 2015/0346727 A1* | 12/2015 | Ramanujam | ......... | G05D 1/0088 |
| | | | | 701/23 |
| 2017/0076513 A1* | 3/2017 | Nordbruch | .......... | B60W 50/082 |
| 2017/0351267 A1* | 12/2017 | Mielenz | ................ | G06T 7/70 |
| 2018/0286240 A1* | 10/2018 | Harai | ................. | G08G 1/14 |
| 2018/0345954 A1* | 12/2018 | Gougeon | .............. | B60W 30/06 |
| 2019/0016331 A1* | 1/2019 | Carlson | ................ | G05D 1/0088 |

OTHER PUBLICATIONS

Office Action cited in corresponding Chinese application No. 201911086574.4; dated Jul. 1, 2022; 20 pp.

* cited by examiner

| Step | Infra | Vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra<br>• Determine human or animal inside the vehicle |
| <2> DETERMINATION OF TARGET POSITION AND GUIDE ROUTE | • Determine the target position, guide route, and permissive driving area, and deliver those information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicles and obstacles (TBD), and monitor safety driving and parking operation of each vehicle (supervise) | • Estimate its own position<br>• Inform the infra of its estimated position / with the accuracy and frequency specified below (TBD)<br>• Inform the infra of its own status<br>• Detect the following obstacles (TBD) |
| <5> AUTONOMOUS PARKING | | • Park and Stop the vehicle at the target position designated by infra (equivalent to PAPS parking requirements) |

Fig. 4A

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop, if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s2 and stop, when the following conditions are met<br>  (1) vehicle received an instruction from infra for E/S<br>  (2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits Vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g. part failure, human or animal remaining inside the vehicle, etc.)<br>• Perform emergency stop when above fault is detected<br>• After coming to a stop, the vehicle shall remain stopped until it receives an instruction from infra to resume automated driving |

Fig. 4B

| DATA | Contents | Transmit (T)/ Receive (R) | | Regularly(F)/ Event(E) Transmission | Note |
|---|---|---|---|---|---|
| | | Infrastructure | Vehicle | | |
| (1) Vehicle qualification information | ID number (VIN) to identify each vehicle | R | T | E when entering the parking | |
| (2) Automated driving preparation instruction | — | T | R | E Right before automated driving start | |
| (3) Vehicle information notification | Vehicle state (normal stop/driving /emergency stop, etc), Vehicle position | R | T | F (1 Hz) | This is also used for communication fault check by the vehicle |
| (4) Vehicle information response | — | T | R | F (1 Hz) | |

Fig. 5A

| DATA | Contents | Transmit (T)/ Receive (R) | | Regularly(F)/ Event(E) Transmission | Note |
|---|---|---|---|---|---|
| | | Infrastructure | Vehicle | | |
| (5) Target position, guide route Delivery | Target position, Passing point location/Permitted time to pass through the point Maximum speed | T | R | E After automated driving instruction | |
| (6) Driving boundaries delivery | A group of lines to surround the permitted driving area | T | R | E After automated riving preparation instruction | |
| (7) Automated driving start instruction | — | T | R | E After delivery of guide route and driving boundaries, when restarting after emergency stop | |
| (8) Emergency stop instruction | — | T | R | | |
| (9) Vehicle control release instruction | — | T | R | | |

Fig. 5B

SYSTEM, METHOD, INFRASTRUCTURE, AND VEHICLE FOR AUTOMATED VALET PARKING

CROSS REFERENCE TO RELATED APPLICATION

This application claims priority to and the benefit of Korean Patent Application No. 10-2018-0137308, filed on Nov. 9, 2018, the entire contents of which are incorporated herein by reference.

FIELD

The present disclosure relates to a system, method, infrastructure, and vehicle for performing automated valet parking.

BACKGROUND

The statements in this section merely provide background information related to the present disclosure and may not constitute prior art.

Many modern cities suffer from various problems associated with vehicle parking. For example, there is a risk of a car collision in a parking lot. For parking in crowded places such as large shopping centers, it takes long time and much energy to park a car due to traffic congestion before entering a parking lot. In addition, it takes a long time and much energy to locate a vacant parking slot even after entering a parking lot. In addition, there is inconvenience that a driver has to walk to a spot at which his or her vehicle is parked when leaving the visited area or that sometimes the driver forgets where the vehicle is parked.

SUMMARY

The present disclosure provides an automated valet parking method in which a vehicle autonomously travels to and parks in a vacant parking slot after the vehicle stops in a drop-off area at which the driver exits the vehicle.

The present disclosure also provides an automated valet parking method in which a driver claims his or her vehicle to leave a visited area, the vehicle that is parked in a parking slot autonomously travels from the parking slot to a pickup area at which the driver conveniently gets in the vehicle to leave a parking lot.

According to one aspect of the present disclosure, an automated valet parking method includes: initiating an automated valet parking procedure of a vehicle; receiving, by the vehicle, a target position and a guide route from an infrastructure for parking the vehicle; performing, by the vehicle, automated valet parking based on the target position and the guide route; and ending, by the vehicle, the automated valet parking procedure.

The initiating of the automated valet parking procedure may include a step of recognizing, by the infrastructure, a driver and the vehicle associated with the driver.

The infrastructure may recognize the driver based on an identification number and a password input by the driver and recognize the vehicle using a unique vehicle number of the vehicle.

The initiating of the automated valet parking procedure may include: turning on an engine (i.e., an ignition switch) of the vehicle; determining whether there is a human or animal left in the vehicle; and locking doors of the vehicle.

The initiating of the automated valet parking procedure may include a step of delegating a driving authority of the vehicle from the vehicle to the infrastructure.

The driving authority includes an authority to execute one or more vehicle operations. The vehicle operations may include steering, accelerating, braking, gear shifting, starting and stopping the vehicle, and locking and unlocking a door of the vehicle.

At least one of the vehicle or the infrastructure may possess the driving authority to execute the braking operation of the vehicle among the vehicle operations.

The method may further include the following steps that are performed before the initiating of the automated valet parking procedure: determining whether the vehicle that is currently performing an autonomous driving event is scheduled to perform an automated valet parking event when the current autonomous driving event ends; determining a state of the vehicle when the vehicle is scheduled to perform the automated valet parking event; determining whether the state of the vehicle is suitable for the automated valet parking; adjusting the state of the vehicle to be suitable for the automated valet parking when the state of the vehicle is not suitable for the automated valet parking; and starting the scheduled automated valet parking event when the state of the vehicle is suitable for the automated valet parking.

The determining of whether the vehicle is scheduled to perform the automated valet parking event may include determining whether an instruction for executing the automated valet parking event is stored in a memory.

The state of the vehicle may include at least one of a speed, an acceleration, or a driving state of the vehicle.

The determining of whether the state of the vehicle is suitable for the automated valet parking may include: comparing the state of the vehicle with predetermined conditions for starting the automated valet parking, and the predetermined conditions may include at least one of a condition of a sensor condition configured to perform the automated valet parking, a reference speed, or a reference acceleration to perform the automated valet parking.

The determining of whether the state of the vehicle is suitable for the automated valet parking may include determining whether the vehicle is malfunctioning.

Adjusting the state of the vehicle to be suitable for the automated valet parking may include adjusting at least one of a speed, an acceleration, or driving state of the vehicle to be suitable for the automated valet parking.

The method may further include determining whether the automated valet parking is possible before the determining of whether the state of the vehicle is suitable for the automated valet parking is performed.

The determining of whether the automated valet parking is possible may include: determining an end time at which the current autonomous driving event ends, an end position at which the current autonomous driving event ends, or both of the end time and the end position; and determining whether the automated valet parking is possible when a current time is close to the end time or when a current position is close to the end position.

The method may further include cancelling the scheduled automated valet parking event when the state of the vehicle does not become suitable for the automated valet parking until a current vehicle position is close to a start position at which the automated valet parking of the vehicle begins or until a current time is close to a start time at which the automated valet parking of the vehicle begins.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A and 4B are diagrams illustrating operations for automated valet parking performed by an infrastructure and a vehicle that work with each other;

FIGS. 5A and 5B are views respectively illustrating a communication process performed by a vehicle and an infrastructure for automated valet parking;

Figure 1:
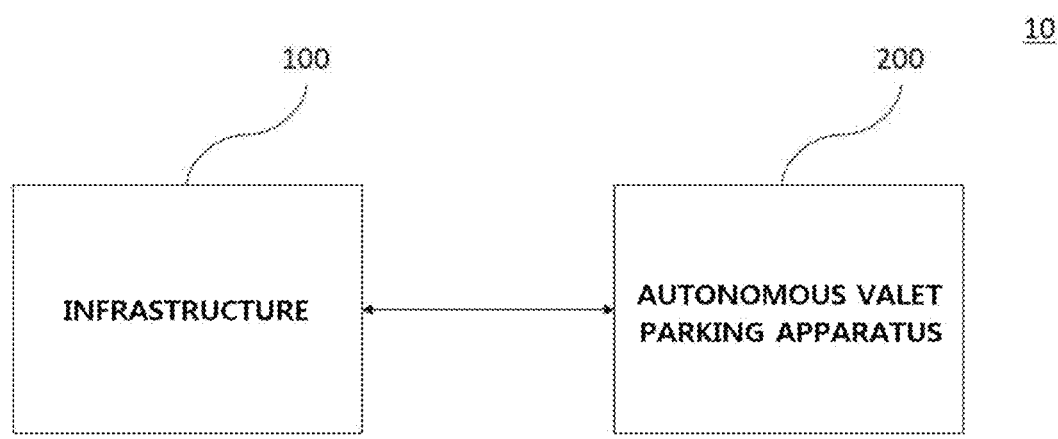
FIG. 1 is a view illustrating an automated valet parking system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, exemplary embodiments of the present disclosure will be described in detail with reference to the accompanying drawings. The construction and operational effect of the present disclosure will be clearly understood from the following detailed description. Prior to describing the exemplary embodiments in detail, it is noted that a detailed description about existing components and functions is omitted when the subject matter of the present disclosure may be obscured by the description.

It is also noted that terms used in the detailed description of the present disclosure are defined below.

The term "driver" refers to a person who uses an automated valet parking service provided by an automated valet parking system.

The term "driving authority" refers to the authority to perform vehicle operations. The term "vehicle operation" refers to an operation such as steering, accelerating, braking, gear shifting, vehicle starting, and door locking and unlocking of a vehicle.

The term "vehicle" refers to a vehicle having an automated valet parking feature.

The term "control center" refers to a facility that can monitor vehicles parked in a parking garage or facility, which determines a target position, a guide route, and a permitted driving area, and which transmits a driving start instruction or an emergency stop instruction to a vehicle.

The term "infrastructure" refers to a parking facility and includes sensors installed in the parking facility. Alternatively, the infrastructure refers to a control center that controls a parking lot gate, vehicles in a parking lot, etc.

The term "target position" refers to a vacant parking slot available for parking. Alternatively, the term "target position" refers to a pickup area where a driver gets in his or her vehicle in a situation when the driver leaves the parking lot.

The term "guide route" refers to a route along which a vehicle travels to reach a target position. For example, at the time of parking a vehicle, the guide route is a route along which the vehicle travels until reaching a vacant parking space after starting from a drop-off area. For example, the guide route is provided in the form of instructions, for example, "traveling forward a distance of 50 m and turning left at the corner".

The term "driving route" refers to a driving path along which a vehicle travels.

The term "permitted driving area" refers to an area where a vehicle can travel in a parking lot. For example, the permitted driving area includes the driving route. The permitted driving area is defined with barrier walls, parked vehicles, parking lines, etc.

FIG. 1 is a view illustrating an automated valet parking system according to one embodiment of the present disclosure. Referring to FIG. 1, an automated valet parking system 10 includes an infrastructure 100 and an automated valet parking apparatus 200.

The infrastructure 100 refers to a facility or system for operating, managing, and controlling an automated valet parking system. For example, the infrastructure 100 may be a parking facility. In one form, the infrastructure 100 includes sensors, communication devices, alarm devices, display devices, and a server device that controls those devices. Alternatively, the infrastructure refers to a control center that controls a parking lot gate, vehicles in a parking lot, etc.

The automated valet parking apparatus 200 refers to a vehicle that can perform automated valet parking. According to embodiments, the automated valet parking apparatus 200 refers to a component or a set of components capable of performing automated valet parking.

Figure 2:
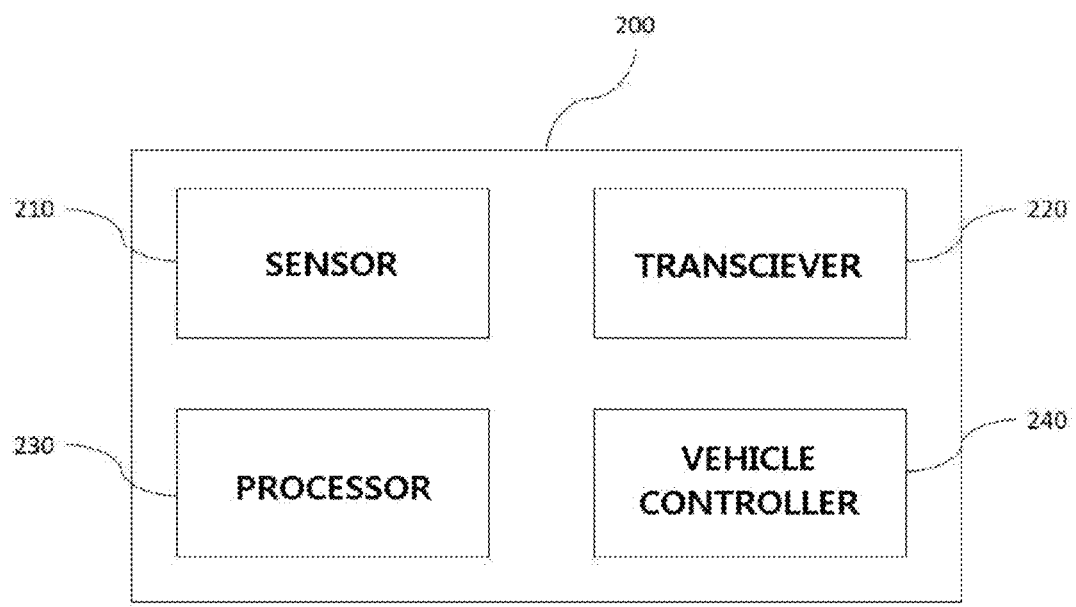
FIG. 2 is a view illustrating an automated valet parking apparatus.

FIG. 2 is a view illustrating an automated valet parking apparatus according to one embodiment of the present disclosure. Referring to FIG. 2, the automated valet parking apparatus 200 (i.e., vehicle) includes a sensor 210, a transceiver 220, a processor 230, and a vehicle controller 240.

The sensor 210 monitors the surroundings of the automated valet parking apparatus 200. In one form, the sensor 210 measures the distance between the automated valet parking apparatus 200 and a specific object or detects an object that is present around the automated valet parking apparatus 200. For example, the sensor 210 includes at least one type of sensor selected from among an ultrasonic sensor, a radar sensor, a lidar sensor, a camera, an infrared sensor, a thermal sensor, and a millimeter wave sensor.

The sensor 210 transmits data that is the detection results of the sensor 210 to the transceiver 220 or to the vehicle controller 240.

The transceiver 220 communicates the data with the infrastructure 100. This communication is called "vehicle to infrastructure (V2I)" communication. The transceiver 220 communicates the data with other vehicles. This communication is called "vehicle to vehicle (V2V)" communication. The V2I communication and the V2V communication are collectively called vehicle-to-everything (V2X) communication. According to embodiments, the transceiver 220 receives the data (for example, a target position, a guide route, a driving route, instructions, etc.) from the infrastructure 100, processes the received data, and transmits the processed data to the processor 230. The transceiver 220 transmits data collected and generated by the vehicle 200 to the infrastructure 100. According to embodiments, the transceiver 220 communicates the data with the terminal device of the driver of the vehicle 200.

The transceiver 220 receives and transmits the data according to a wireless communication protocol or a cable communication protocol. Examples of the wireless communication protocol include, not limitedly, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The processor 230 controls the overall operation of the vehicle 200. The processor 230 controls the vehicle controller 240 on the basis of the data transmitted from the sensor 210 and from the transceiver 220. According to embodiments, the processor 230 generates a control signal for controlling the vehicle controller 240 on the basis of the data transmitted from the infrastructure 100 and then transmits the control signal to the vehicle controller 240.

That is, the processor 230 refers to a device that performs a series of calculations or makes a series of determinations to control the vehicle 200 and to perform automated valet parking. For example, the processor 230 is a processor that operates according to a computer program including instructions for performing automated valet parking.

The vehicle controller 240 controls the vehicle 200 according to the determination made by the processor 230. According to embodiments, the vehicle controller 240 controls the vehicle 200 according to the control signal transmitted from the processor 230. For example, the vehicle controller 240 controls various vehicle operations such as driving, stopping, restarting, steering, accelerating, decelerating, lamp lighting, alarm sounding, etc.

That is, the vehicle controller 240 functions to control all kinds of operations of the vehicle 200 described herein.

On the other hand, although not described herein, the operations and/or functions of the vehicle 200 described in the description herein are performed by the conjunction of one or more components selected from among the sensor 210, the transceiver 220, the processor 230, and the vehicle controller 240.

Figure 3:
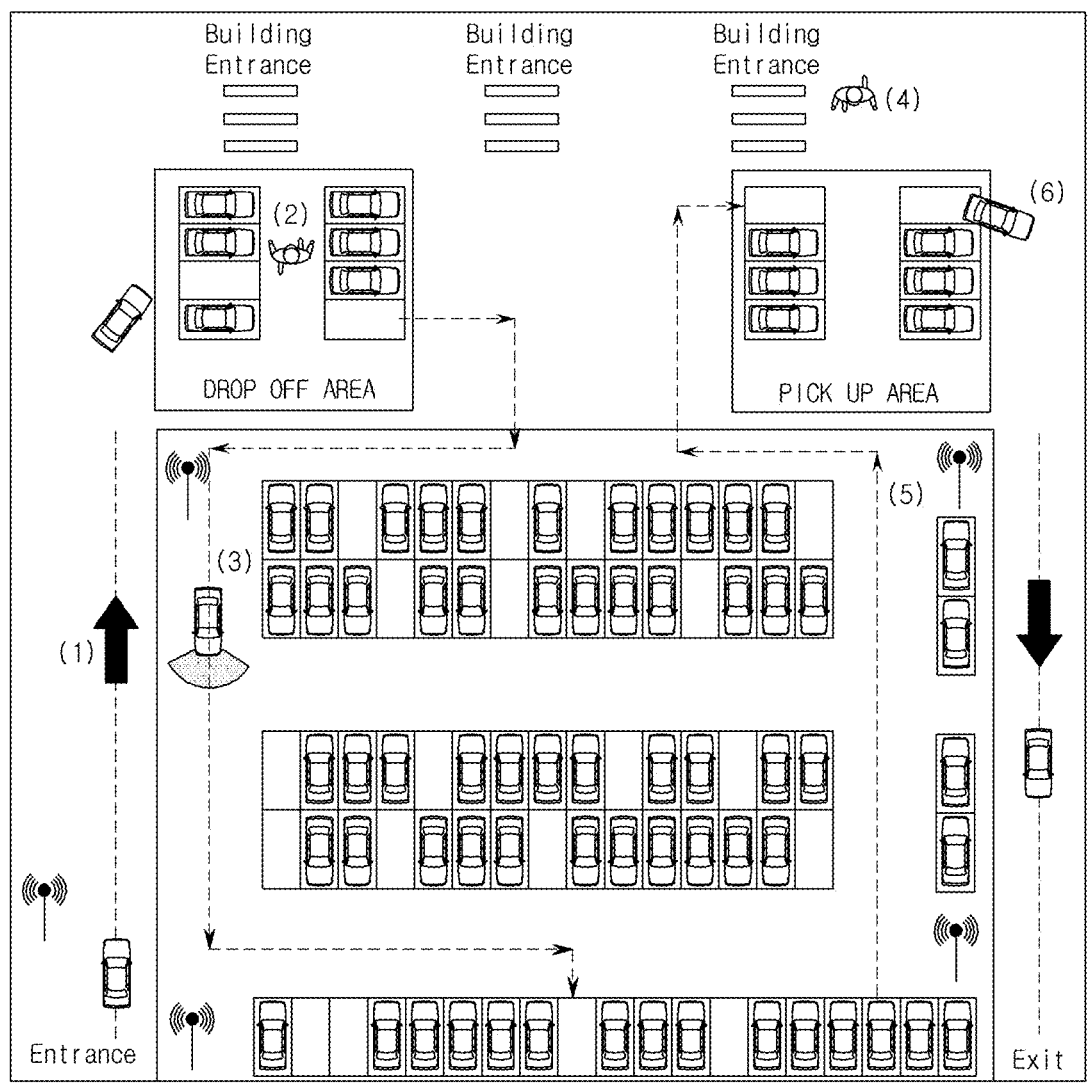
FIG. 3 is a conceptual view illustrating an automated valet parking system and method.

FIG. 3 is a conceptual view illustrating an automated valet parking system and an automated valet parking method according to one embodiment of the present disclosure.

Referring to FIG. 3, in step (1), a driver drives a vehicle to a drop-off area at which the driver will exit the vehicle after passing through the entrance of a parking lot.

In step (2), the driver exits the vehicle at the drop-off area and the authority to drive or control the vehicle is delegated to the infrastructure.

In step (3), the infrastructure searches for a vacant parking slot and assigns a suitable vacant parking slot to the vehicle. The infrastructure determines a guide route leading to the assigned vacant parking slot. After the parking slot and the guide route are determined, the vehicle autonomously travels along the guide route to reach the parking slot and performs autonomous parking in the parking slot.

In step (4), the driver claims his or her vehicle parked in the parking lot and walks to a pickup area where the vehicle will be returned to the driver.

In step (5), the infrastructure determines a suitable target position. For example, the suitable target position may be a vacant parking slot of multiple parking slots within the pickup area. The infrastructure determines a guide route which leads the claimed vehicle to the target position. After the target position and the guide route are determined and transmitted to the vehicle, the vehicle autonomously travels along the guide route to reach the target position and performs autonomous parking.

In step (6), the driver arrives at the pickup area and takes over the authority to drive the vehicle. The driver drives the vehicle toward the exit of the parking lot.

FIGS. 4A and 4B are diagrams illustrating operations for automated valet parking performed by an infrastructure and a vehicle.

In step (1), an automated valet parking preparation process is performed. An infrastructure identifies a driver and a vehicle and determines whether the driver and the vehicle are qualified. For example, the infrastructure determines whether the driver is a qualified driver by reading an identification number (ID) or a password input by the driver. In addition, the infrastructure determines whether the vehicle is a qualified vehicle by reading a vehicle identification number of the vehicle. The vehicle can turn on and off the engine thereof by itself. The vehicle can turn on and off a power supply by itself. For example, a state in which the engine of the vehicle is turned off and the power supply is turned on is referred to as an accessary-on (ACC-On) state. The engine on/off and the power supply on/off of the vehicle are performed according to an instruction transmitted from the infrastructure or automatically performed without depending on the instruction transmitted from the infrastructure. The vehicle can lock and unlock the doors by itself. The locking/unlocking of the vehicle doors is performed according to an instruction transmitted from the infrastructure or is autonomously performed by the vehicle without depending on the instruction from the infrastructure. When the vehicle proceeds to an autonomous parking step, the doors of the vehicle may be locked.

In addition, the driving authority of the vehicle is delegated to the infrastructure from the vehicle. The driving authority means an authority to control vehicle operations. The vehicle operations include steering, accelerating, braking the vehicle, gear shifting, turning on and off an ignition switch of the vehicle, and locking and unlocking a door of the vehicle. Since the driving authority of the vehicle is delegated to the infrastructure, the infrastructure can take complete control of the vehicle during the automated valet parking procedure of the vehicle. Accordingly, it is possible to lower a risk that unintended vehicle operations occur and to prevent vehicle accidents in the parking lot. However, in some cases, the driving authority may be partially delegated to the infrastructure so that the vehicle can still control some of the vehicle operations, or the driving authority may be shared by the vehicle and the infrastructure. For example, a braking operation may be performed when an emergency occurs during the automated valet parking procedure. Therefore, the vehicle may apply a brake without intervention of the infrastructure when the vehicle senses a danger with help of an ADAS sensor. In addition, the vehicle checks whether a person or animal is present in the vehicle. Since a parking duration from the completion of the automated valet parking to the discharging of the vehicle from a parking lot is long, if a person or animal is accidently left in the vehicle while the vehicle is parked, the person or animal would be in danger. Therefore, it is desired that the vehicle is empty before the vehicle is autonomously parked. A sensor mounted in the vehicle may check whether a person or animal is present in the vehicle.

In step (2), a process of determining a target position, a guide route, and a driving route is performed. The determination of the target position, the guide route, and the driving route is performed by the infrastructure. The target position, the guide route, and the driving route determined by the infrastructure are delivered from the infrastructure to the vehicle.

In step (3), an autonomous driving operation of the vehicle is performed in the parking lot. The autonomous driving of the vehicle includes traveling, stopping, and restarting. The autonomous driving of the vehicle is performed according to an instruction transmitted from the infrastructure to the vehicle. Alternatively, the autonomous driving of the vehicle may be performed without relying on the instruction from the infrastructure. The vehicle can autonomously travel to the target position along the guide route within the permitted driving area. During the driverless autonomous driving of the vehicle, the vehicle is controlled to travel at a preset speed or below. This preset speed may be a value transmitted from the infrastructure to the vehicle or may be a value stored in the vehicle. In addition, the vehicle is controlled not to deviate from an error margin of the given guide route when traveling along the guide route. This preset error margin may be a value transmitted from the infrastructure to the vehicle or may be a value stored in the vehicle. In addition, the vehicle may turn with a predetermined minimum turning radius when it is desired to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement operation is performed. The target of the position measurement may be a vehicle to be parked in a parking lot, an obstacle existing in the parking lot, or a vehicle that is parked in the parking lot. The infrastructure measures the position of the vehicle or the obstacle and store the measured position in a database. The infrastructure identifies and detects vehicles or obstacles and monitors the safety of each of the plurality of vehicles in the parking lot. In addition, the infrastructure monitors the operating state of the vehicle that is performing autonomous parking after reaching the target position and transmits an instruction on the basis of the results of the monitoring. The vehicle measures its position. The vehicle transmits the measured position to the infrastructure. The error of the position measured by the vehicle needs to be within a predetermined error range. The predetermined error range is determined by the infrastructure. The vehicle detects obstacles present around the vehicle, measures the positions of the obstacles, and transmits the measured positions of the obstacles to the infrastructure. The frequency of communication between the vehicle and the infrastructure is a predetermined frequency.

In step (5), an autonomous parking operation is performed by the vehicle. The autonomous parking refers to an operation in which the vehicle that has reached around the target position driverlessly enters a target vacant parking slot. The vehicle performs autonomous parking by sensing nearby obstacles or vehicles that are parked by using a distance sensor mounted on the vehicle. Examples of the distance sensor mounted on the vehicle include an ultrasonic sensor, a radar sensor, a lidar sensor, and a camera.

In step (6), an emergency braking operation is performed. The emergency braking of the vehicle is performed according to an instruction transmitted from the infrastructure or may be performed by itself when the vehicle detects an obstacle. The infrastructure instructs the vehicle to apply an emergency brake when it is determined that an area around the vehicle is unsafe. When the infrastructure determines that the surroundings of the vehicle become safe after the emergency braking is performed, the infrastructure instructs the vehicle to resume autonomous driving or autonomous parking. When the vehicle detects an obstacle, the vehicle applies an emergency brake according to its own determination. In addition, the vehicle reports to the infrastructure the emergency braking that is performed by itself or the type or location of an obstacle which is the cause of the emergency braking. The vehicle reduces its speed according to a predetermined deceleration value preset for the emergency braking. This predetermined deceleration value is a value determined by the infrastructure or a value stored in the vehicle. The predetermined deceleration value may be determined according to the type of obstacle, the position of the obstacle, and the distance between the vehicle and the obstacle. The vehicle resumes autonomous driving or autonomous parking upon receiving a resumption instruction for the autonomous driving or autonomous parking from the infrastructure. Alternatively, the vehicle resumes the autonomous driving or autonomous parking when it confirms that the obstacle is removed. The vehicle reports to the infrastructure of the resumption of autonomous driving or autonomous parking and of the removal of the obstacle.

In step (7), the automated valet parking procedure is finished. After the vehicle has completed autonomous driving and autonomous parking, the infrastructure issues a control release instruction to the vehicle. The vehicle can turn on and off the engine and turn on and off the power supply according to an instruction received from the infrastructure or without depending on the instruction from the infrastructure. In addition, the vehicle can lock and unlock the vehicle doors according to an instruction received from the infrastructure or without depending on the instruction from the infrastructure. Further, the vehicle can apply a parking brake according to an instruction received from the infrastructure or without depending on the instruction from the infrastructure.

In step (8), an error control operation is performed. The error control is performed when an error occurs in communication between the vehicle and the infrastructure and/or when a mechanical error of the vehicle occurs. The infrastructure monitors communication with the vehicle to detect whether a communication error occurs. The vehicle detects a communication error by monitoring the communication with the infrastructure. The vehicle detects whether a mechanical error occurs by monitoring operating states of built-in accessories including sensors mounted thereon. The vehicle detects the presence of a person or animal in the vehicle and applies an emergency brake when the presence of a person or animal is detected. The vehicle resumes autonomous parking or autonomous driving according to an instruction received from the infrastructure when the vehicle is in an emergency stop state. Alternatively, the vehicle may determine, by itself, whether the cause of the emergency braking is removed and resumes autonomous parking or autonomous driving when the cause of the emergency braking is removed.

FIGS. 5A and 5B are diagrams respectively illustrating a communication process performed between the infrastructure for automated valet parking and a vehicle according to one embodiment of the present disclosure.

In step (1), vehicle qualification information is delivered from the vehicle to the infrastructure. The vehicle qualification information includes an identifier that distinguishes each vehicle from other vehicles. For example, the vehicle qualification information may be a unique vehicle number (for example, license plate number) of the vehicle. The vehicle qualification information is transmitted when an automated valet parking preparation process is performed after the vehicle enters a parking lot (see bracketed reference numeral (1) of FIG. 4A).

In step (2), an automated valet parking preparation instruction is transmitted from the infrastructure to the vehicle. The automated valet parking preparation instruction is transmitted before the autonomous driving of the vehicle begins.

In step (3), vehicle information is transmitted from the vehicle to the infrastructure. The vehicle information includes state information of the vehicle and position information of the vehicle. The state information of the vehicle includes whether the vehicle is traveling, whether the vehicle is stopped, or whether the vehicle is in an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a predetermined time that is estimated according to the communication frequency, the infrastructure determines that an error has occurred in communication between the vehicle and the infrastructure.

In step (4), an acknowledgement of the reception of the vehicle information is transmitted from the infrastructure to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle and the infrastructure. For example, when the vehicle information does not reach the infrastructure at a predetermined time that is estimated according to the communication frequency, the infrastructure determines that an error has occurred in communication between the vehicle and the infrastructure.

In step (5), a target position and a guide route are delivered from the infrastructure to the vehicle. The delivery of the target position and the guide route may be performed either before or after an automated valet parking start instruction is transmitted from the infrastructure to the vehicle.

In step (6), driving-area boundary information is transmitted to the vehicle from the infrastructure. The driving-area boundary information includes landmarks (for examples, lines demarcating parking slots, a central line, and road boundary lines demarcating a driving lane) that mark the boundaries of a permitted driving area. The transmission of the driving-area boundary information is performed after the automated valet parking preparation instruction is delivered. This driving-area boundary information is transmitted from the infrastructure to the vehicle in the form of a parking lot map.

In step (7), the automated valet parking start instruction is transmitted from the infrastructure to the vehicle. The transmission of the automated valet parking start instruction is performed after the guide route and the driving-area boundary information are delivered. Alternatively, the automated valet parking start instruction is transmitted when the cause of the emergency braking is removed.

In step (8), an emergency brake instruction is transmitted to the vehicle from the infrastructure.

In step (9), a vehicle control release instruction is transmitted to the vehicle from the infrastructure. The delivery of the vehicle control release instruction is performed after the vehicle is autonomously parked in a parking slot.

Figure 6:
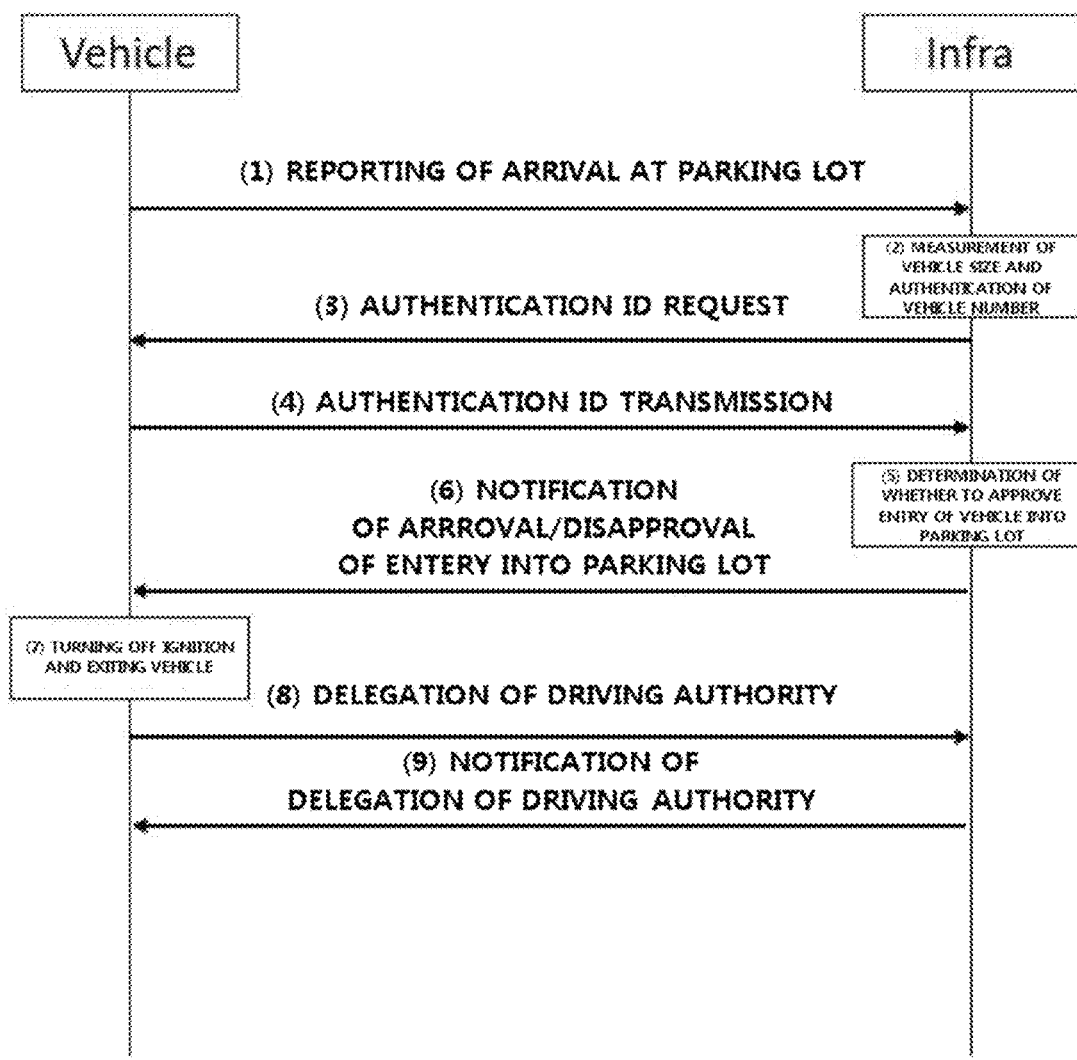
FIG. 6 is a view illustrating a communication process performed by a vehicle and an infrastructure for automated valet parking.

FIG. 6 is a diagram illustrating a communication process performed between an infrastructure 100 for automated valet parking and a vehicle 200.

In step (1), the vehicle 200 enters a parking lot and stops at a predetermined stop position. This stop position may be an entrance gate of the parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 notifies the vehicle whether the vehicle 200 is permitted to enter the parking lot according to the results of the authentication. For example, the infrastructure 100 displays a message indicating approval or disapproval on a display panel installed around the stop position. The driver drives the vehicle 200 to a drop-off area when the entry of the vehicle into the parking lot is approved. In step (7), the driver turns off the ignition of the vehicle 200, gets off the vehicle 200, locks the vehicle doors, and leaves the drop-off area. In step (8), the authority to drive the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification is sent to a driver's smart device through a mobile communication network.

Figure 7:
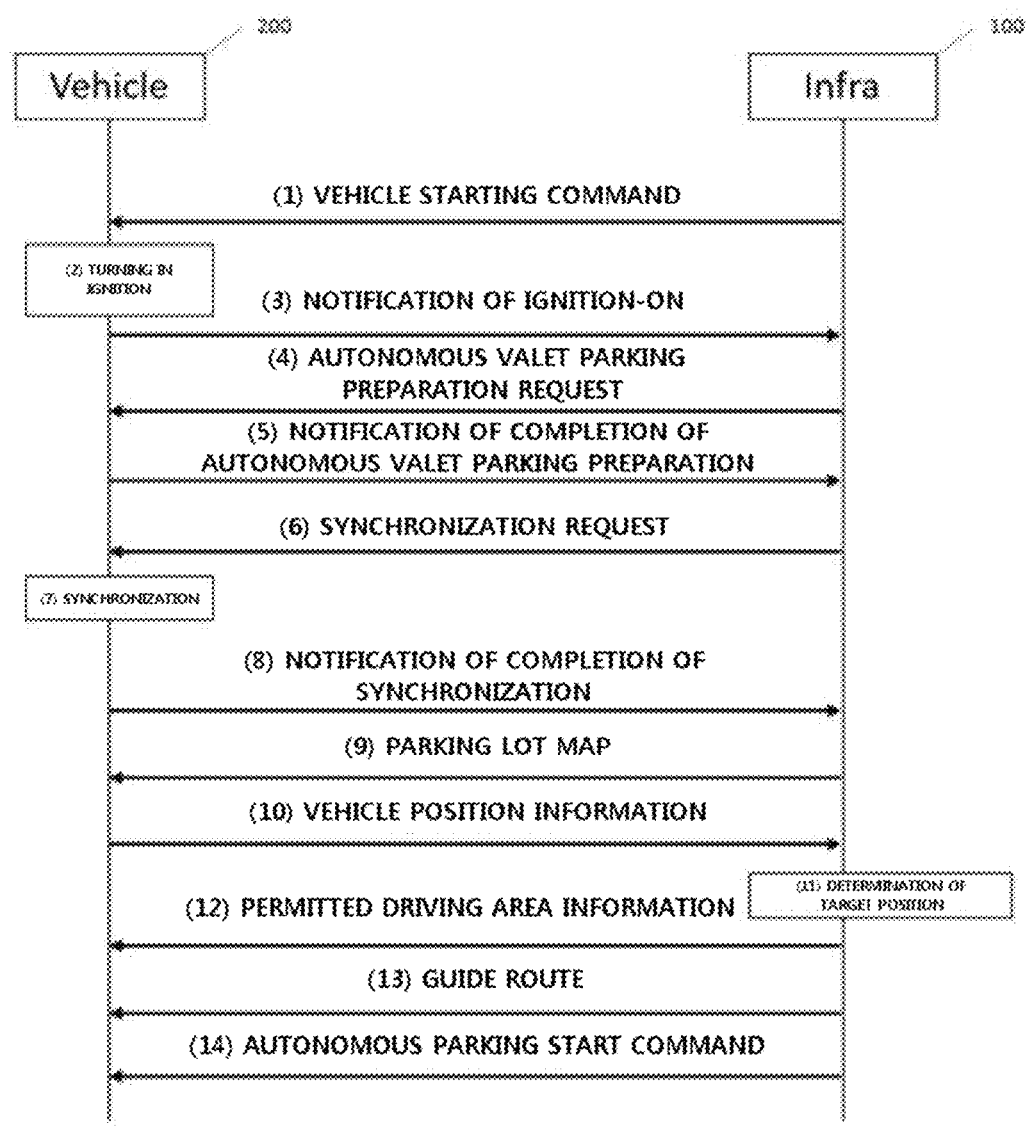
FIG. 7 is a view illustrating a communication process performed by a vehicle and an infrastructure for automated valet parking.

FIG. 7 is a diagram illustrating a communication process performed between an infrastructure 100 for automated valet parking and a vehicle 200.

In step (1), the infrastructure 100 transmits a vehicle starting request to the vehicle 200. In step (2), the vehicle 200 turns on the ignition according to the vehicle starting request transmitted from the infrastructure 100. In step (3), the vehicle 200 turns on the ignition and then notifies the infrastructure 100 that the ignition is turned on 100. In step (4), the infrastructure 100 transmits an automated valet parking preparation request to the vehicle 200. In step (5), the vehicle 200 transmits a reply to the automated valet parking preparation request to the infrastructure 100. The reply is a message of OK indicating that the preparation for automated valet parking is completed or a message of NG indicating that the preparation for automated valet parking is not completed. In step (6), the infrastructure 100 transmits a synchronization request to the vehicle 200. The synchronization request is a request for instructing synchronization of the time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a reply indicating that the synchronization is completed to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes landmark information. In step (10), the vehicle 200 estimates (or calculates) the position of the vehicle 200 on the basis of the transmitted landmark information, and the vehicle 200 transmits the estimated position of the vehicle 200 to the infrastructure 100. In step (11), the infrastructure 100 determines a target position (parking position). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
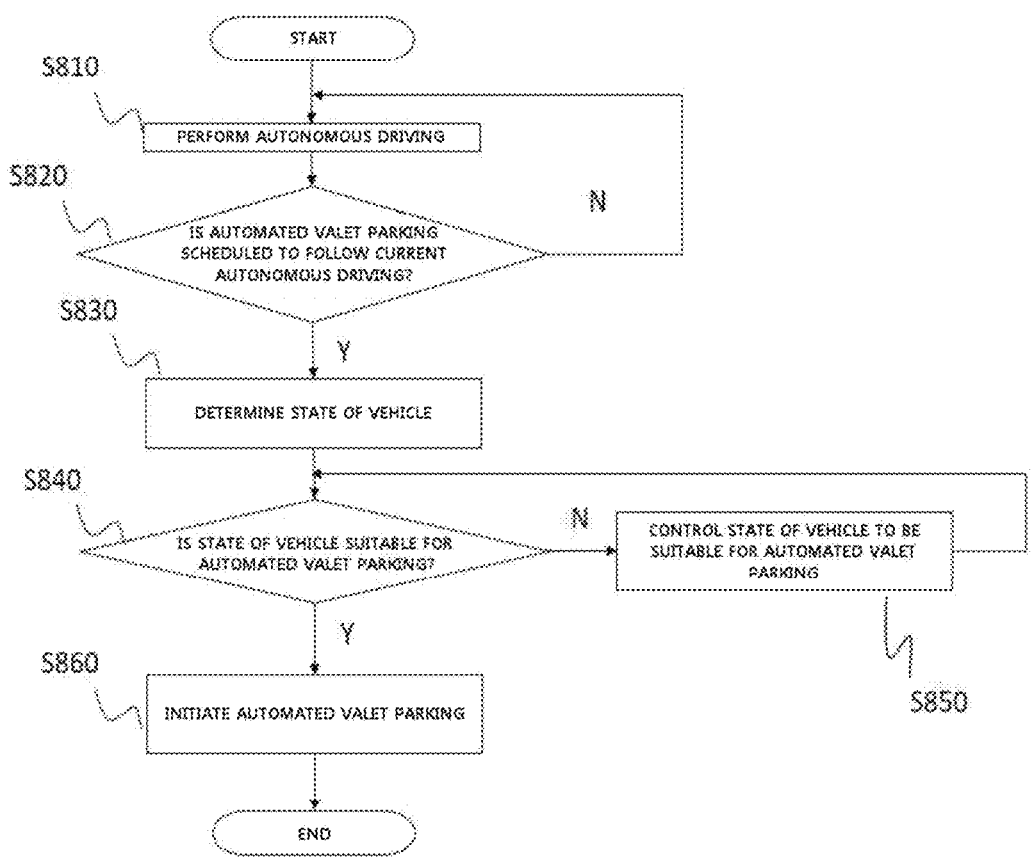
FIG. 8 is a flowchart illustrating an automated valet parking method.

FIG. 8 is a flowchart illustrating an automated valet parking method according to one embodiment of the present disclosure. A series of steps included in the automated valet parking method according to the present disclosure is performed under control of the infrastructure 100 or under control of the own control mechanism of the vehicle.

Referring to FIG. 8, the vehicle 200 performs autonomous driving outside a parking lot that supports an automated valet parking service in step S810. That is, the vehicle 200 performs autonomous driving outside the parking lot, which will be referred to as outside autonomous driving herein. It is noted that the outside autonomous driving is different from the automated valet parking performed inside the parking lot. In other words, the autonomous driving performed in step S810 is distinguished from the automated valet parking step and is a step performed before the automated valet parking inside the parking lot is performed. The outside autonomous driving refers to urban autonomous driving or highway autonomous driving but is not limited thereto. According to embodiments, the outside autonomous driving of the vehicle 200 is performed by its own control but is not limited thereto.

While the vehicle 200 is performing current outside autonomous driving outside a parking lot, it is determined whether the vehicle 200 is scheduled to perform automated valet parking after the current outside autonomous driving in step S820. According to embodiments, a determination of whether the vehicle 200 is scheduled to perform automated valet parking is performed by referring to a memory device in which instructions for controlling the vehicle 200 are stored. According to embodiments, it is determined whether an automated valet parking event will follow a current autonomous driving event when each autonomous driving event begins. According to embodiments, it is determined whether an automated valet parking event will be performed in a predetermined time duration from a current autonomous driving event. For example, multiple sets of instructions for implementing an autonomous driving and parking function of the vehicle 200 are stored in the memory device provided in the infrastructure 100. For example, the sets of instructions include a first set of instructions for a highway autonomous driving event, a second set of instructions for an urban autonomous driving event which will follow the highway autonomous driving event, and a third set of instructions for an automated valet parking event which will follow the urban autonomous driving event. In this case, the infrastructure 100 refers to the memory device to determine whether the third set of instructions for executing an automated valet parking event will be performed after the first set of instructions for executing the current autonomous driving event (for example, urban autonomous driving event) is performed. For example, multiple sets of instructions for implementing an autonomous driving and parking function of the vehicle 200 are stored in in a memory device of the vehicle 200. For example, the sets of instructions include a first set of instructions for a highway autonomous driving event, a second set of instructions for an urban autonomous driving event and a third set of instructions for an automated valet parking event. In this case, the vehicle 200 refers to its own memory device to determine whether the instructions for executing an automated valet parking event will be performed after the instructions for executing the current autonomous driving event (for example, urban autonomous driving event) are performed.

When it is determined that the automated valet parking event is not scheduled to follow the current autonomous driving (N in S820), the vehicle 200 continuously performs the current autonomous driving event.

When it is determined that the automated valet parking event is scheduled to follow the current autonomous driving (Y in S820), the states of the vehicle 200 are checked in step S830. According to embodiments, the vehicle states include the speed of the vehicle 200, the acceleration of the vehicle 200, the driving state of the vehicle 200, or any combination thereof.

The speed of the vehicle 200 may be an instantaneous speed (current speed) of the vehicle 200 or an average speed over a predetermined time duration. The acceleration of the vehicle 200 may be an instantaneous acceleration (current acceleration) of the vehicle 200 or an average acceleration over a predetermined time duration. The driving states of the vehicle 200 include a current location of the vehicle 200, a surrounding environment of the vehicle 200, states of respective components (for example, built-in sensors) of the vehicle 200, and whether the vehicle is abnormal or normal. According to embodiments, the infrastructure 100 or the vehicle 200 determines the state of the vehicle 200. For example, the infrastructure 100 receives vehicle state information from the vehicle 200 and determines the current state of the vehicle 200. Alternatively, the vehicle 200 may determine its own state on the basis of vehicle state information transmitted from at least one component thereof.

Next, it is determined whether the vehicle 200 can perform automated valet parking on the basis of the determined vehicle state in step S840. According to embodiments, the determined vehicle states and automated valet parking conditions are compared to determine whether the vehicle 200 is in a state of being able to perform automated valet parking. The automated valet parking conditions are transmitted from outside or are stored in the memory device. For example, the infrastructure 100 reads the automated valet parking conditions stored therein, compares the determined vehicle states and the automated valet parking conditions, and determines whether the vehicle 200 can perform the automated valet parking on the basis of the results of the comparison. Alternatively, the vehicle 200 may receive the automated valet parking conditions from the infrastructure 100, compares its own vehicle states and the received automated valet parking conditions (namely, predetermined conditions), and determines whether the vehicle 200 can perform the automated valet parking on the basis of the results of the comparison.

The automated valet parking conditions (i.e., predetermined conditions) include a condition of sensors, a reference speed, and a reference acceleration, which are desired to perform the automated valet parking. For example, the sensor-related condition means at least one item among the types of sensors, the number of sensors, and the performance of sensors that are desired to perform the automated valet parking.

For example, when the speed of the vehicle 200 is lower than the reference speed, the acceleration of the vehicle 200 is lower than the reference acceleration, or the sensors included in the vehicle 200 do not satisfy the type, number, and performance of the sensors desired for the automated valet parking, it is determined that the states of the vehicle 200 are not suitable for automated valet parking.

According to embodiments, it is determined whether the vehicle 200 is normal or abnormal on the basis of the vehicle states. When the vehicle 200 is abnormal, it is determined that the vehicle 200 cannot perform the automated valet parking. That is, when at least one part or element of the vehicle 200 is malfunctioning, it is determined that the vehicle 200 cannot perform the automated valet parking.

Before it is determined whether the vehicle states are suitable for the automated valet parking (S840), external conditions are checked to determine whether the vehicle 200 can perform the automated valet parking. Only when the external conditions are satisfied, the determination based on the vehicle states is performed. For example, it is determined whether the destination (parking lot) of the vehicle 200 can provide an automated valet parking service.

According to embodiments, it is determined whether the automated valet parking is possible in the destination of the vehicle 200, on the basis of map information of the parking lot, information on a target position (parking space) in the parking lot, and information on the currently occupied parking space in the parking lot.

For example, first, the infrastructure 100 obtains the information on the parking space (target position) in the parking lot and the information on the occupied space in the parking lot using at least one sensor. Then, the infrastructure 100 determines whether the vehicle 200 can perform the automated valet parking in the target position on the basis of the obtained information and the map information of the parking lot (destination).

According to embodiments, the vehicle 200 may receive at least one type of information selected from among map information of the parking lot (destination), information on the target parking space in the parking lot, and information on the occupied parking space in the parking lot from the infrastructure 100, and determines that the automated valet parking is possible in the destination on the basis of the received information. The information on the parking lot is obtained while the vehicle is performing autonomous driving.

According to embodiments, the vehicle 200 estimates an end time of the current autonomous driving event or determines an end position at which the current autonomous driving event ends. When the current time is close to the end time or the current position is close to the end position, it is automatically determined whether the automated valet parking of the vehicle 200 is possible.

For example, the infrastructure 100 receives at least one of the end time and the end position from the vehicle 200 and determines whether the automated valet parking of the vehicle 200 is possible on the basis of the received information.

For example, the vehicle 200 calculates or estimates at least one of the end time and the end position and determines whether the automated valet parking of the vehicle 200 is possible on the basis of the end time and/or the end position.

According to embodiments, when it is determined that the automated valet parking of the vehicle 200 is not possible, the vehicle 200 cancels the automated valet parking event scheduled to be performed in the parking lot (destination) or modifies the automated valet parking event to be performed in a different parking lot.

For example, the infrastructure 100 creates a new schedule such that the vehicle 200 can be parked in a different parking lot that supports automated valet parking. In this case, the infrastructure 100 transmits information on automated valet parking in the different parking lot.

For example, the vehicle can cancel the currently scheduled automated valet parking and make a new automated value parking schedule for a different parking lot.

When the vehicle states of the vehicle 200 are not suitable for the vehicle 200 to perform the automated valet parking (N in S840), the vehicle states are adjusted such that the vehicle 200 can perform the automated valet parking in step S850.

For example, the infrastructure 100 transmits to the vehicle 200 an instruction for adjusting the vehicle states to be suitable for automated valet parking. The vehicle 200 controls its states according to the instruction. Alternatively, the vehicle 200 may self-control its states to be suitable for automated valet parking without depending on the instruction from the infrastructure.

For example, at least one of the speed, acceleration, and driving state of the vehicle 200 is adjusted so as to be suitable for automated valet parking. That is, the speed of the vehicle 200 is adjusted to be equal to or lower than the reference speed, or the acceleration of the vehicle 200 is adjusted to be equal to or lower than the reference acceleration.

For example, when one element of the vehicle 200 is malfunctioning, the infrastructure 100 notifies the vehicle 200 of the malfunctioning of the element.

Alternatively, when one element of the vehicle 200 is malfunctioning, the vehicle 200 performs a self-repairing function to fix the malfunctioning of the element or notifies the driver of the malfunctioning of the element.

After the vehicle states of the vehicle 200 are adjusted so as to be suitable for automated valet parking (S850), it is confirmed whether the adjusted states are suitable for the automated valet parking.

According to embodiments of the present disclosure, when the adjustment of the vehicle states of the vehicle 200 is self-controlled by the vehicle, the infrastructure 100 rechecks whether the adjusted vehicle states are suitable for automated valet parking. However, the present disclosure is not limited thereto. That is, the rechecking may be performed by the vehicle 200.

According to embodiments of the present disclosure, when the adjustment of the vehicle states of the vehicle 200 is controlled by the infrastructure 100, the adjusted vehicle states are rechecked by the vehicle 200. However, the present disclosure is not limited thereto. That is, the rechecking may be performed by the infrastructure 100.

When the adjusted vehicle states are still not suitable for the automated valet parking, the states of the vehicle 200 are readjusted.

According to embodiments of the present disclosure, when the states of the vehicle 200 cannot be adjusted to be suitable for the automated valet parking until the current vehicle position is close to a start position at which the automated valet parking of the vehicle 200 will begin or until the current time is close to a start time at which the automated valet parking of the vehicle 200 will begin, the scheduled automated valet parking event is cancelled.

According to embodiments of the present disclosure, when the number of determination that the vehicle states are not suitable for the automated valet parking exceeds a reference number, the scheduled automated valet parking event is cancelled.

For example, the canceling of the schedule automated valet parking event is made by the infrastructure 100 or the vehicle 200. The infrastructure 100 transmits a notification of the canceling to the vehicle 200 after canceling the scheduled automated valet parking event.

When the vehicle states of the vehicle 200 are suitable for automated valet parking (Y in S840), the vehicle 200 starts the scheduled automated valet parking in step S860.

In one or more exemplary embodiments, the described functions may be implemented in the form of hardware, software, firmware, or any combination thereof. When implemented in the form of software, these functions may be stored on or transmitted to a computer-readable medium in the form of one or more instructions or codes. The computer-readable medium refers to any medium that can transfer a computer program from one computer to another. For example, it may be a communication medium or a computer-readable storage medium. The storage medium may be an arbitrary medium that can be accessed by a computer. The computer-readable media include, not limitedly, RAMS, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers. For example, software can be transferred from a website, server or other remote sources through a cable or over a wireless channel. Examples of the cables include coaxial cable, fiber optic cable, twisted pair cable, and digital subscriber line (DSL). Examples of the wireless channel include infrared frequency waves, radio frequency waves, and ultrahigh frequency waves. In this case, the coaxial cable, the fiber optic cable, the twisted pair cable, the DSL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When embodiments are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit in a manner of transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary embodiments. Of course, the above-described embodiments do not cover all possible combinations of components and/or methods to implement the present disclosure. Thus, those skilled in the art will appreciate that many further combinations and substitutions of components and/or methods in various embodiments are possible. Accordingly, the above-described embodiments cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the term "infer" or "inferencing" generally refers to a process of determining or inferring a state of a system, environment, and/or user from a set of observations of events and/or data. Inferencing can be used to identify a specific situation or action, or can generate a probability distribution of certain states, for example. Inferencing is probabilistic. That is, inferencing may mean a calculation of a probability distribution of those states, based on study on data and events. Inferencing may involve techniques used to construct a higher level event from a set of events and/or data. The inferencing refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, but not limitedly, hardware, firmware, any combination of hardware and software, software, or a computer entity associated with software being executed therein. For example, the term "component" may refer to, not limitedly, a process running on a processor, a processor, an object, an executable thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

What is claimed is:

1. An automated valet parking method controlled by an infrastructure, the method comprising:
being delegated a driving authority of a vehicle;
transmitting, to the vehicle, a target position and a guide route for parking the vehicle;
transmitting, to the vehicle, information of driving boundaries indicating a permitted driving area after transmitting the target position and the guide route;
transmitting, to the vehicle, an automated valet parking start instruction so that the vehicle performs automated valet parking at the target position along the guide route within the permitted driving area; and
transmitting, to the vehicle, a vehicle control release instruction after the vehicle is autonomously parked in the target position.

2. The method according to claim 1, further comprising: recognizing a driver and the vehicle associated with the driver.

3. The method according to claim 2, wherein the infrastructure is configured to recognize the driver based on an identification number and a password input by the driver and configured to recognize the vehicle using a unique vehicle number of the vehicle.

4. The method according to claim 1, further comprising:
turning on an ignition of the vehicle;
checking whether there is a human or animal left in the vehicle so as to ensure that the vehicle is empty before the vehicle is autonomously parked; and
locking doors of the vehicle.

5. The method according to claim 1, wherein:
the driving authority of the vehicle comprises an authority to execute one or more vehicle operations, and
the vehicle operations include steering, accelerating, braking, gear shifting, starting and stopping the vehicle, and locking and unlocking a door of the vehicle.

6. The method according to claim 5, wherein the driving authority to execute braking among the vehicle operations is possessed by at least one of the vehicle or the infrastructure.

7. The method according to claim 1, further comprising:
determining whether the vehicle that is currently performing an autonomous driving event is scheduled to perform an automated valet parking event after the current autonomous driving event;
determining a state of the vehicle when the vehicle is scheduled to perform the automated valet parking event;
determining whether the state of the vehicle is suitable for the automated valet parking;
adjusting the state of the vehicle to be suitable for the automated valet parking when the state of the vehicle is not suitable for the automated valet parking; and
starting the scheduled automated valet parking event when the state of the vehicle is suitable for the automated valet parking.

8. The method according to claim 7, wherein determining whether the vehicle is scheduled to perform the automated valet parking event comprises: determining whether an instruction for executing the automated valet parking event is stored in a memory.

9. The method according to claim 7, wherein the state of the vehicle is determined based on at least one of a speed, an acceleration, or a driving state of the vehicle.

10. The method according to claim 7, wherein:
determining whether the state of the vehicle is suitable for the automated valet parking comprises: comparing the state of the vehicle with predetermined conditions for starting the automated valet parking, and
the predetermined conditions include at least one of a condition of a sensor configured to perform the automated valet parking, a reference speed to perform the automated valet parking, or a reference acceleration to perform the automated valet parking.

11. The method according to claim 7, wherein determining whether the state of the vehicle is suitable for the automated valet parking comprises: determining whether the vehicle is malfunctioning.

12. The method according to claim 11, wherein adjusting the state of the vehicle comprises: adjusting at least one of a speed, an acceleration, or driving state of the vehicle to be suitable for the automated valet parking.

13. The method according to claim 7, further comprising: determining whether the automated valet parking is possible before determining whether the state of the vehicle is suitable for the automated valet parking.

14. The method according to claim 13, wherein determining whether the automated valet parking is possible comprises:
determining at least one of an end time at which the current autonomous driving event ends, or an end position at which the current autonomous driving event ends; and
determining whether the automated valet parking is possible when a current time is close to the end time or when a current position is close to the end position.

15. The method according to claim 7, further comprising: cancelling the scheduled automated valet parking event when the state of the vehicle does not become suitable for the automated valet parking until a current vehicle position is close to a start position at which the automated valet parking of the vehicle begins or until a current time is close to a start time at which the automated valet parking of the vehicle begins.

16. A non-transitory computer-readable storage medium comprising a program configured to be executed at an infrastructure and including instructions for performing an automated valet parking method, the method comprising:
being delegated a driving authority of a vehicle;
transmitting, to the vehicle, a target position and a guide route for parking the vehicle;
transmitting, to the vehicle, information of driving boundaries indicating a permitted driving area;
transmitting, to the vehicle, an automated valet parking start instruction so that the vehicle performs automated valet parking at the target position along the guide route within the permitted driving area; and transmitting, to the vehicle, a vehicle control release instruction after the vehicle is autonomously parked in the target position.

17. An automated valet parking system comprising:

an infrastructure configured to:
- be delegated a driving authority of a vehicle;
- transmit, to the vehicle, a target position, a guide route for parking the vehicle;
- transmit, to the vehicle, information of driving boundaries indicating a permitted driving area;
- transmit, to the vehicle, an automated valet parking start instruction so that the vehicle performs automated valet parking at the target position along the guide route within the permitted driving area; and
- transmit, to the vehicle, a vehicle control release instruction after the vehicle is autonomously parked in the target position.

18. The automated valet parking system according to claim 17, wherein the infrastructure is further configured to:
turn on an ignition of the vehicle;
check whether there is a human or animal left in the vehicle; and
lock doors of the vehicle.

19. The automated valet parking system according to claim 18, wherein the driving authority to execute the braking among vehicle operations is owned by at least one of the vehicle or the infrastructure.

* * * * *